United States Patent Office 3,064,807
Patented Nov. 20, 1962

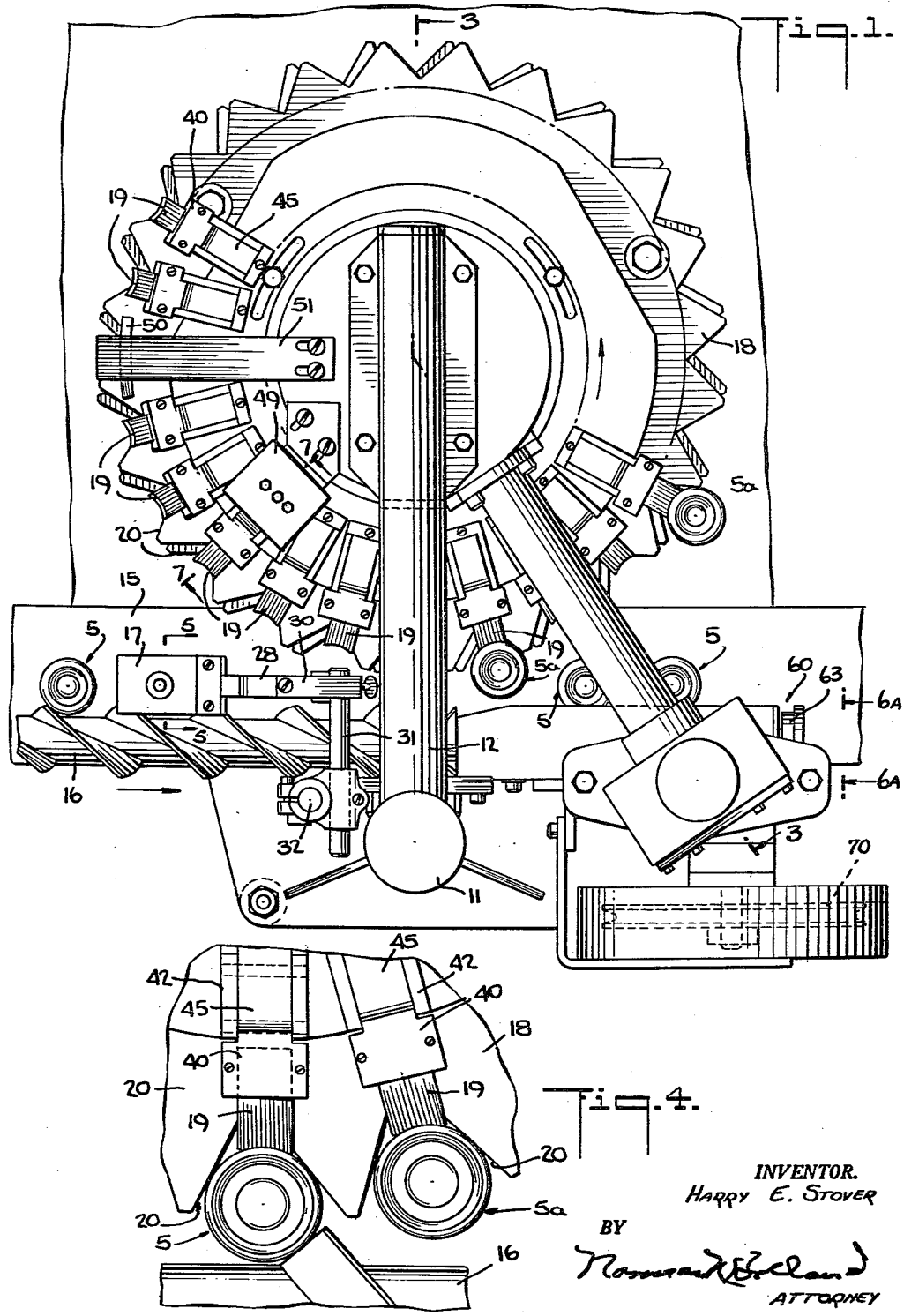

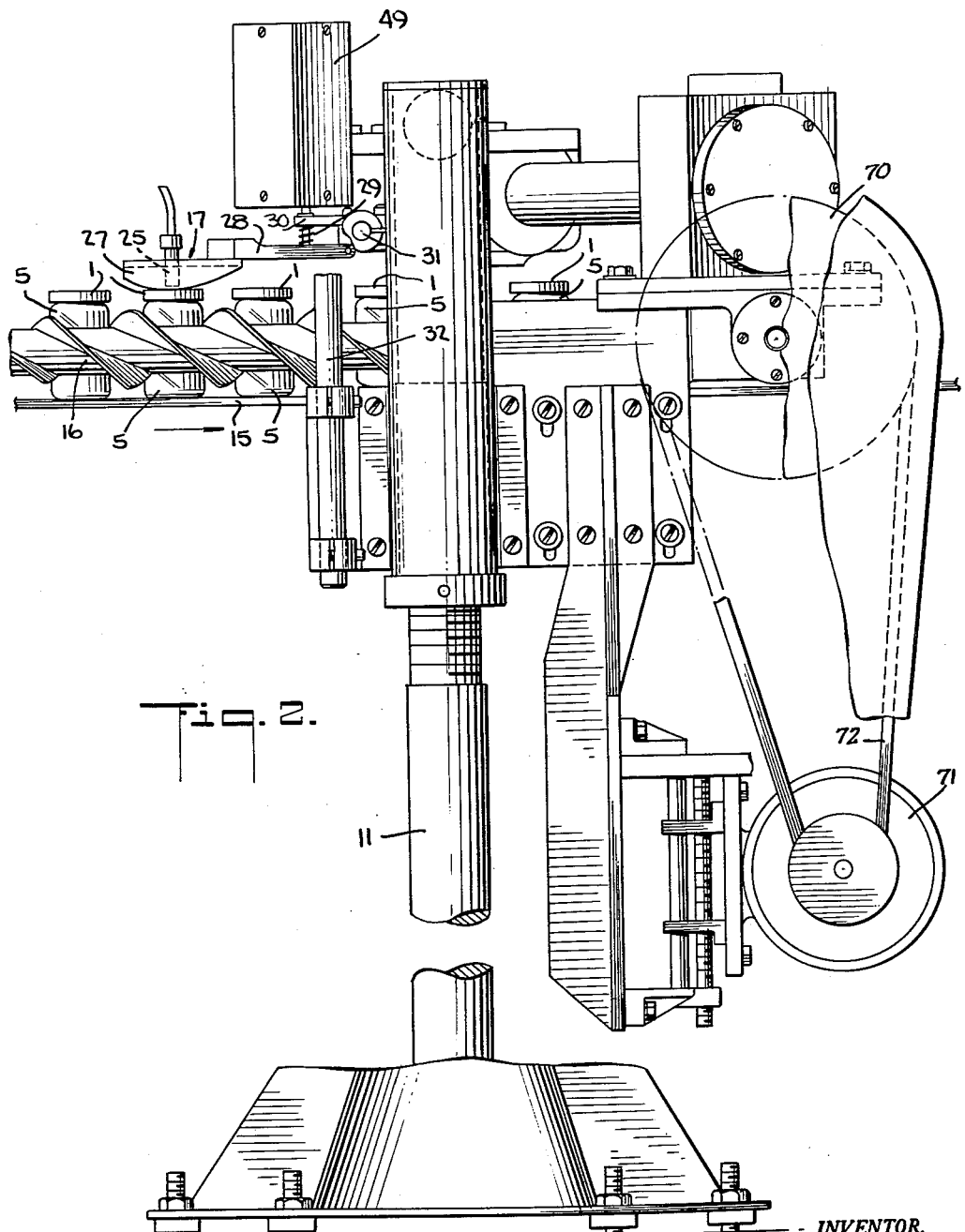

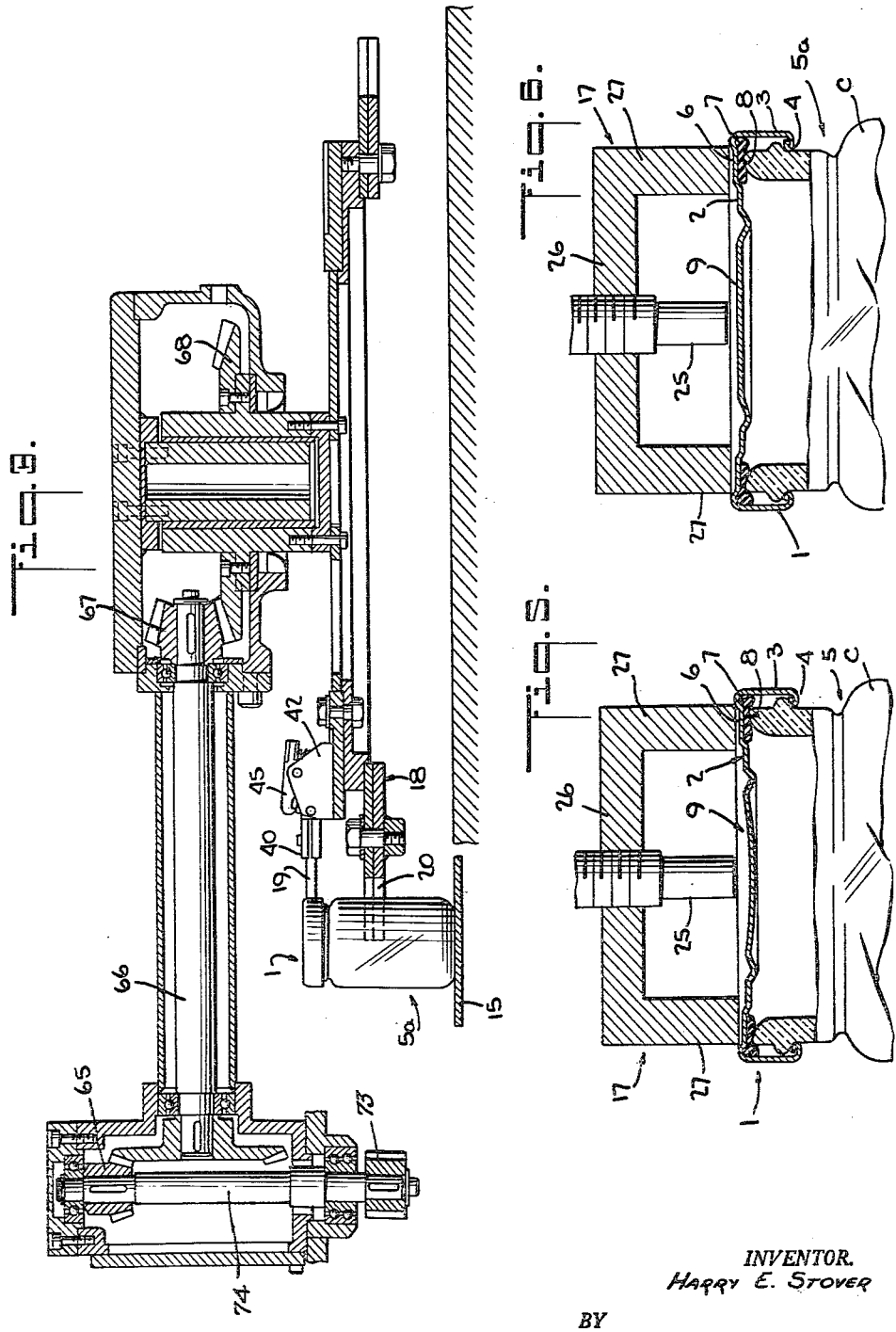

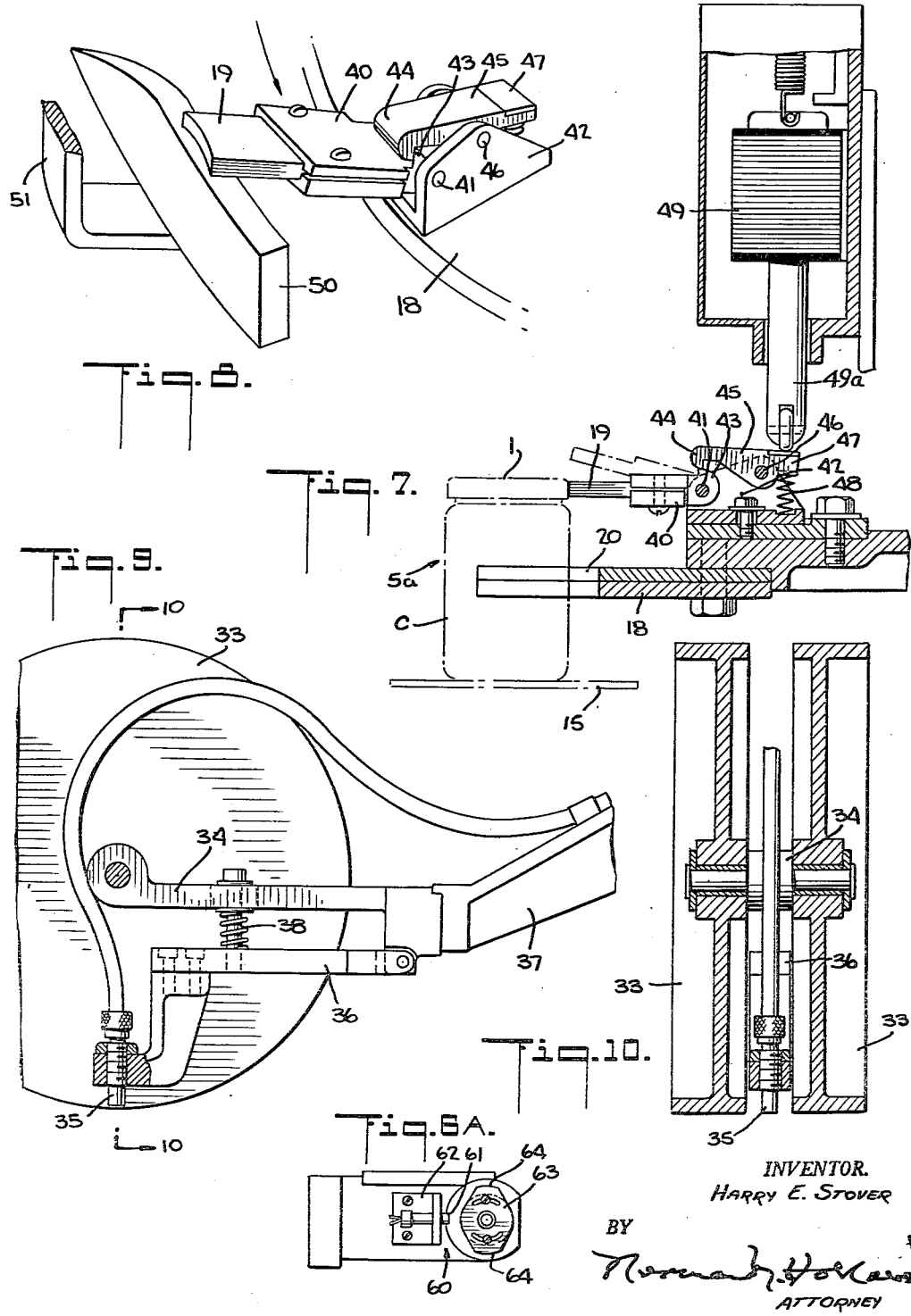

3,064,807
DETECTING MECHANISM
Harry E. Stover, Lancaster, Ohio, assignor to Anchor Hocking Glass Corporation, Lancaster, Ohio, a corporation of Delaware
Filed Aug. 11, 1960, Ser. No. 48,939
9 Claims. (Cl. 209—72)

The present invention relates to a mechanism for detecting the presence or absence of a vacuum in a container and more particularly to a mechanism for detecting the presence of a vacuum in a container and for rejecting containers which have no vacuum.

The increased use of products which are packaged in a vacuum necessitates accurate testing of the packages after initial sealing to determine whether the containers are properly sealed with a vacuum.

Recently, it has become desirable to hermetically seal containers with closure caps in which the cover portion is adapted to flex downwardly when there is a vacuum in the container. With this type of closure cap the housewife or a retailer may easily determine whether or not a container has a vacuum by a visual inspection of the cover portion of the cap, which is not flexed downwardly if there is no vacuum.

If a container is improperly sealed and has no vacuum not only are the contents of the package subject to spoilage but a housewife may believe that the container has been tampered with. It is therefore necessary to test the packages after sealing to determine whether the package is hermetically sealed.

One object of the present invention provides an improved mechanism for testing sealed packages to determine whether or not a vacuum is present therein.

Another object of the present invention is the provision of an improved testing mechanism which will automatically reject any sealed packages which do not have a vacuum.

Another object of the present invention is to provide an improved detecting mechanism which will operate continuously without interruption to permit greater speeds.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a top plan view of the vacuum detecting mechanism made in accordance with the present invention;

FIG. 2 is a side elevational view of the vacuum detecting mechanism shown in FIG. 1;

FIG. 3 is a sectional view taken along line 3—3 of FIG. 1 showing the drive means for vacuum detecting mechanism of the present invention;

FIG. 4 is a plan view of a detail of the detecting mechanism showing the manner in which the defective containers are rejected;

FIG. 5 is an exaggerated view, partly in section, showing the position of the cover portion of the closure cap of a sealed package which has a vacuum present therein;

FIG. 6 is an exaggerated view similar to FIG. 5 showing the position of the cover portion of the closure cap of a sealed package which has no vacuum therein;

FIG. 6A is an end view taken along line 6A—6A of FIG. 1 showing a timing proximity detector;

FIG. 7 is a sectional view taken along line 7—7 of FIG. 1 showing the means for moving the package rejecting mechanism of the present invention into operative position;

FIG. 8 is a perspective view showing the means of restoring the rejecting mechanism to its inoperative position;

FIG. 9 is a sectional view of a modification of the proximity detector used with the vacuum detecting means of the present invention; and FIG. 10 is a sectional view thereof taken along line 10—10 of FIG. 9.

For convenience, the invention will first be described generally and the details of construction will be described under separate headings.

*General Description*

FIGS. 5 and 6 show the type of closure adapted to be used with the present invention. In general, the closure cap 1 comprises a cover portion 2 and a skirt portion 3 depending therefrom. The skirt portion 3 is provided with a plurality of locking lugs 4 to permit the cap to be applied to the container C to form a sealed package 5. The cover portion 2 is provided with a gasket-receiving channel 6 adapted to receive a gasket 7 which cooperates with the rim 8 of the sealed package 5 to form a hermetic seal.

The cover portion 2 has a flip panel 9 which will flex downwardly as shown in FIG. 5 if a vacuum is within the sealed package 5 and which will not flex down if no vacuum is present in the defective sealed container 5a as shown in FIG. 6. It will be understood of course that the closure cap 1 shown in the drawings and described herein is illustrative only of the type of closure cap which may be used with the present invention and that any closure cap which utilizes a flip panel, a flip cover, or any other cap having a diaphragm type surface in its cover which will flex downwardly if there is a vacuum in the sealed package may be used with the present invention. It will further be understood that the term "flip panel" as used herein refers not only to the flip panel 9 on the closure cap shown in FIGS. 5 and 6 but also to a flip cover (i.e., the full cover flips up and down) or to any other cap having a diaphragm type surface on its cover.

Referring to FIG. 1 the packages 5 are moved by a conveyor 15 mounted on a frame 11 (FIG. 2) and are separated and timed to cooperate with a star wheel 18 by a helicoid or rotating screw conveyor 16. The packages are moved beneath a proximity detector unit 17 which senses the position of the cover portion of the closure, as more fully described below, and which will actuate a rejecting mechanism if the sealed package has no vacuum and the cover portion is not flexed down (FIG. 6). The reject mechanism is carried on a star wheel 18 mounted on frame 11 through a beam 12 and is rotating in synchronism with the screw 16. The reject mechanism comprises a pivotally mounted magnet 19 located above each pocket 20 of star wheel 18 (FIG. 4) and movable from a normally upward inoperative position (broken line position in FIG. 7) to a downwardly operative position (full line position in FIG. 7) to remove defective packages 5a.

If a sealed package 5 which passes beneath the proximity detector unit 17 has a vacuum therein, as shown in FIG. 5, the flip panel 9 of the cap is flexed downwardly and the proximity detector unit 17 is not activated. Therefore, the rejecting magnets 19 remain in their raised inoperative position and the containers 5 pass on to other work stations (not shown). However, if a package such as package 5a (FIGS. 1 and 4), is defectively sealed and does not have a vacuum therein, the flip panel 9 will not be flexed down, as shown in FIG. 6, which will bring it within the range of the proximity detector 17 and thus activate it. The activation of the proximity detector unit 17 will release one of the rejecting magnets 19 on star wheel 18 and permit it to drop to a substantially horizontal position (full line position in FIG. 7) so that the magnet attracts the metal closure cap of the defective package 5a and holds the package 5a in the pocket 20 of the star wheel 18 which it overlies. As the star wheel 18 continues to rotate, the sealed package 5a is held in place by the magnet 19 and is moved away from the line of acceptable containers by the star wheel 18. It is thereafter discarded at a suitable discard station (not shown). It will be understood of course, that, instead of magnets, other mechanisms may be used to hold the defective packages such as mechanical hooks or arms, if the closure caps of the packages are made of non-magnetic material.

*Proximity Detector Unit*

The proximity detector unit 17 used with the present invention is shown in FIGS. 5 and 6 and may be any well-known type of proximity detector unit which activates a circuit depending on the nearness of a metallic mass without touching the metallic mass. Such proximity detectors are well-known and have been described in the June 20, 1958 issue of Electronic Engineering Edition; the February 1958 issue of Automation; and the June 1958 issue of Production. The detector unit 17 comprises a detector head 25 threadably mounted on a shoe 26 made of a plastic or some other non-magnetic material having a pair of depending rails 27 adapted to abut the edge of the closure cap to act as a reference point for the detector head 25. The rails 27 locate the detector head 25 a predetermined distance from the cover portion 2 of the closure cap so that if the cover portion is flexed down (vacuum within the package) the detector head 25 is not activated whereas if the cover portion is not flexed down (no vacuum in the package) the detector head is activated. The unit 17 is mounted on an arm 28 (FIGS. 1 and 2), spring-pressed downwardly by a spring 29, pivotably mounted on a bracket 30 held on a horizontal support rod 31 which is vertically adjustable on a standard 32 affixed to the frame 11 of the machine.

In order to prevent the detector head 25 of the proximity detector 17 from being activated as the rim of the closure cap of each package passes therebeneath and to permit it to be activated only when the flip panel 9 is passing therebeneath, a timing proximity detector 60 is provided at the end of the helicoid assembly as shown in FIGS. 1 and 6A. The timing proximity detector 60 is in circuit with the proximity detector 17 and is timed to be operative for a predetermined time interval which coincides with the time that the flip panel 9 moves beneath detector head 25 so that the detector head 25 is activated only when flip panel 9 passes therebeneath and not when the rim passes thereby.

The timing proximity detector 60 is similar to the detector unit 17 and comprises a detector head 61 mounted on a bracket 62 and a cam 63 adjustably mounted on the end of helicoid 16 for rotation therewith. The rotating cam 63 has a pair of high points 64 which are adapted to be sensed by the detector head 61 to activate the circuit. The cam 63 is of the correct length of dwell to activate the circuit only while the detector head 25 of proximity detector 17 is over the flip panel 9. Hence, the edge or rim of the closure passing beneath the detector head 25 (FIGS. 5 and 6) has no effect since the head is energized only over the flip panel 9.

With this structure, as the sealed packages pass beneath the proximity detector unit 17, the two rails 27 abut the peripheral edges of the cover portion 2 of the closure cap 1 to act as a reference point for the proximity detecting head 25. If there is a vacuum within the sealed package 5 so that its flip panel 9 is flexed downwardly (FIG. 5), the flip panel 9 lies a sufficient distance away from the detector head 25 so as not to activate it. On the other hand, if there is no vacuum in a container so that flip panel 9 is not flexed down (FIG. 6), the flip panel is close enough to the detector head 25 to activate it and to place the rejecting magnets 19 into operative position to remove the defective sealed package as will be more fully described hereinafter.

FIGS. 9 and 10 show a modification of the proximity detector unit which may be used with the present invention. In this embodiment a pair of wheels 33 lie on either side of detector head 35 and are rotationally mounted on arm 34 which extends from a bracket 37. The proximity detector head 35 is mounted on an arm 36 pivotally mounted on the bracket 37. The arm 36 is spring-pressed by spring 38 so as to bias the detector head 35 toward sealed packages passing beneath. The wheels 33 will abut the peripheral edges of the cover portion of the cap to act as a reference point for the proximity detector head 35 which then operates in the same manner as the proximity detector head 25 shown in FIGS. 5 and 6.

*Rejecting Mechanism*

The rejecting mechanism for defective containers is shown in FIGS. 3, 7 and 8 and comprises a permanent magnet 19 held above each pocket 20 in the star wheel 18 by a clamp 40 which is pivotally mounted at 41 on a bracket 42 affixed to the star wheel 18. The rear edge of the clamp 40 has an integral hook 43 adapted to cooperate with the hook 44 of a latch 45 pivotally mounted at 46 on bracket 42 hold the clamp 40 and its magnet 19 in a normally raised position (dotted line position in FIG. 7). The rear end 47 of latch 45 is spring-pressed upwardly by a spring 48 so as to bias hook 44 of latch 45 downwardly into retaining engagement with hook 43 of magnet-holding clamp 40.

The rear end 47 of the latch 45 underlies the armature 49a of a solenoid 49 at the same time that the proximity detector head 25 is over the center of the closure cap as shown in FIGS. 5 and 6. The solenoid 49 is in circuit with the circuit which is activated by the proximity detector unit 17 so that when the flip panel is up and the proximity detector unit is activated to close the circuit, the solenoid 49 is energized to reject the defectively sealed package. When the solenoid 49 is energized the armature 49a is depressed to rotate latch 45 around pivot 46 and raise the hook 44 to release the hook 43 of the magnet-holding clamp 40 and the magnet 19 which it carries to move to a substantially horizontal operative position as shown in full lines in FIG. 7.

Normally, the clamp 40 and the magnet 19 are in the raised dotted line positions as shown in FIG. 7. If a sealed package has a vacuum therein the detector unit 17 is not activated so that solenoid 49 is not energized and the magnet 19 remains in its raised inoperative position without affecting sealed packages passing thereby. However, when the detector head of the proximity detector senses a defective sealed package which has no vacuum therein, the detector head is activated to energize the solenoid 49 and depress its armature 49a to thereby pivot the latch 45 on its pivot 46 so as to raise the hook 44 and release the clamp 40. The clamp 40 and its magnet 17 drops to a substantially horizontal position. With the magnet 17 in this position, the metal closure cap of the defective sealed package will be attracted by the magnet and the defective sealed package 5a will be held in the pocket 20 of the star wheel 18 (FIG. 4). Continued rotation of the star wheel 18 will move the sealed package to a discard station (not shown) where it is removed from the pocket 20.

After the defective sealed package has been discarded, the magnet 19 and its holding clamp 40 is moved back to its raised inoperative position by engaging a stationary cam 50, as shown in FIG. 8 which depends from a bracket 51 and which engages the undersurface of the magnet 19 and raises it until its hook 43 is engaged by the hook 44 of the latch 45 which locks the clamp 40 in its raised position.

Driving Means

The driving means for the machine of the present invention is shown in FIGS. 2 and 3 and comprises a main drive wheel 70 driven by a suitable motor 71 mounted on the frame 11 through a belt 72. The drive wheel 70 rotates the screw conveyor 16 by any well-known means and also drives the star wheel 18 through the intermediation (FIG. 3) of spur gear 73, shaft 74, spur gear 65, intermediate shaft 66, spur gear 67 and gear 68. Hence, the rotation of the screw conveyor 16 is in synchronism with the rotation of star wheel 18. With this arrangement the time it takes for a sealed package to travel the distance between the proximity detecting unit 17 to the point of tangency between the screw conveyor 16 and the star wheel 18 is equal to the time it takes a pocket 20 of star wheel 18 to travel the distance between the magnet lowering solenoid 49 and the point of tangency. Hence, after a magnet 19 is lowered by the solenoid 49 energized by a defective sealed package beneath detector unit 17 it will come into contact with the defective sealed package at the point of tangency to remove this defective sealed package from the line.

Operation

In operation, sealed packages 5 are moved by the conveyor 15 beneath the proximity detector unit 17. The proximity detector unit 17 senses the flip panel 9 of the cover portion of the closure cap of the sealed package and at the same time the detector head 61 of the timing detector unit 60 senses one of the high points 64 of rotating cam 63 to activate the circuit. If there is a vacuum in the container and the cover portion is flexed downwardly, the proximity unit is not activated, the magnets 19 remain in their raised inoperative position, and the sealed packages move on.

However, if a sealed package, such as package 5a, has no vacuum therein the cover portion of the closure cap is not flexed down so as to come within the range of and to activate the proximity detecting unit 17 which will energize the solenoid 49. The solenoid 49 depresses its armature 49a which pivots the magnet-retaining latch 45 thus raising its hook 44 to release the magnet 19 which drops to a substantially horizontal operative position.

When the defective sealed package 5a and the lowered magnet 19 meet at the point of tangency of the star wheel 18 and the screw conveyor 16, the magnet 19 attracts the metal cap of the sealed package 5a to hold it in the pocket 20 of the star wheel and, as the star wheel 18 continues to rotate, takes it out of line. The defective sealed package will be transported by the continued rotation of the star wheel 18 to a discard station (not shown) where it is removed from the pocket 20. As the star wheel continues rotation, the magnet 19 is returned to its initially raised inoperative position by the cam 50.

It will be seen that the present invention provides an improved mechanism for detecting the presence or absence of a vacuum in a sealed package which is continuous and uninterrupted and which will automatically reject the defective sealed packages.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A detecting mechanism for detecting the presence of a vacuum in a sealed package having a flexible metallic closure cap with a metallic flexible diaphragm type cover portion which is depressed when there is a proper vacuum in the sealed package and which is undepressed when the vacuum is improper, said mechanism comprising means for moving a plurality of sealed packages successively through a path, sensing means fixed adjacent said path and spaced above the cover portions of sealed packages in said path, said sensing means having a sensing head, the lower edge of which is spaced a predetermined distance above the cover portion of the closure cap of a package in said path and being activatable upon a predetermined spacing of the metallic mass of the cover portion to said sensing head, a reject mechanism in a normally inoperative position, actuating means responsive to activation of said sensing means for placing said reject mechanism into operative position to reject sealed packages having an improper vacuum, and timing means provided to activate said sensing means only when the central area of said diaphragm type cover portion is passing therebeneath.

2. A detecting mechanism as claimed in claim 1, wherein said timing means comprises a timing proximity detector in circuit with the sensing means, said proximity detector activatable by the nearness of a mass thereto, a cam having a high point mounted adjacent said proximity detector, said cam being rotated so that the high point thereof is adjacent said proximity detector to activate it only when the central portion of the cover portion is passing beneath the sensing means.

3. A detecting mechanism as claimed in claim 2, in which said reject mechanism comprises a pivotally mounted magnet held in a normally raised inoperative position above the path of said sealed packages and wherein actuation of said actuating means by said sensing means lowers said magnet to its operative rejecting position adjacent the path of said sealed packages.

4. A detecting mechanism as claimed in claim 3, wherein said magnet is held in a normally raised inoperative position by a latch and wherein said latch is adapted to be moved by said actuating means to lower said magnet to its operative position.

5. A detecting mechanism as claimed in claim 4, in which said actuating means comprises a solenoid located above said latch.

6. A detecting mechanism as claimed in claim 5, wherein said magnets are mounted on a rotating star wheel having pockets therein, and wherein movement of the rejecting means to said operative position pulls defectively sealed packages into the pockets of said star wheel.

7. A detecting mechanism as claimed in claim 6, wherein a reject mechanism lies above each pocket in said star wheel.

8. A detecting mechanism as claimed in claim 7, wherein said sensing means comprises a pair of rails and a sensing head between said rails.

9. A detecting mechanism as claimed in claim 8, wherein said sensing means comprises a pair of wheels and a sensing head between said wheels.

References Cited in the file of this patent

UNITED STATES PATENTS

| | | |
|---|---|---|
| 2,524,929 | Razek | Oct. 10, 1950 |
| 2,734,628 | Schlayer | Feb. 14, 1956 |
| 2,922,445 | Osmond | Jan. 26, 1960 |
| 2,936,071 | Fauth | May 10, 1960 |
| 2,960,223 | Fauth | Nov. 15, 1960 |

FOREIGN PATENTS

| | | |
|---|---|---|
| 516,267 | Canada | Sept. 6, 1955 |

Automation, February 1958. (Copy in Scientific Library.)